(12) United States Patent
Hall

(10) Patent No.: US 9,316,335 B2
(45) Date of Patent: Apr. 19, 2016

(54) CLAW CLAMP

(76) Inventor: Alan Webster Hall, Chandler, AZ (US)

( * ) Notice: Subject to any disclaimer, the term of this patent is extended or adjusted under 35 U.S.C. 154(b) by 60 days.

(21) Appl. No.: 12/978,487

(22) Filed: Dec. 24, 2010

(65) Prior Publication Data

US 2012/0161441 A1 Jun. 28, 2012

(51) Int. Cl.
*F16L 23/00* (2006.01)
*F16L 23/036* (2006.01)
*F16J 13/06* (2006.01)

(52) U.S. Cl.
CPC .............. *F16L 23/036* (2013.01); *F16J 13/06* (2013.01)

(58) Field of Classification Search
CPC ......... F16L 23/12; F16L 23/02; F16L 23/036; F16L 49/04; F16L 47/14; B25B 1/01; B25B 3/00; B25B 5/067; B25B 5/085; B25B 5/125
USPC ......... 285/368, 363, 364, 366, 405, 406, 410, 285/412, 414, 411; 269/143, 249, 3, 6, 43; 29/243.5, 257
See application file for complete search history.

(56) References Cited

U.S. PATENT DOCUMENTS

| | | | |
|---|---|---|---|
| 1,236,816 A * | 8/1917 | Behan | 285/268 |
| 1,530,965 A | 3/1925 | Wild | |
| 1,537,884 A * | 5/1925 | Romine et al. | 269/221 |
| 1,643,737 A | 9/1927 | Benson | |
| 1,756,185 A | 4/1930 | Falck | |
| 2,251,730 A * | 8/1941 | Caldwell | 269/3 |
| 2,260,708 A | 10/1941 | French | |
| 2,530,203 A | 11/1950 | Lear | |
| 2,566,072 A * | 8/1951 | Snell | 269/213 |
| 4,150,477 A | 4/1979 | Orr | |
| 4,979,273 A * | 12/1990 | Friedrickson et al. | 24/525 |
| 6,375,194 B1 * | 4/2002 | Peng | 277/314 |
| 2010/0244443 A1 | 9/2010 | Irgens | |

FOREIGN PATENT DOCUMENTS

CH 445952 * 10/1967

OTHER PUBLICATIONS

"Flanges, Fittings, & Components", Kurt J. Lesker Company, pp. 1-5; 1-69 through 1-76; 1-83 through 1-86, document properties indicate document was last modified Oct. 23, 2009.
"Hot Bolting", www.contractorsunlimited.co.uk/toolbox/hotbolting/shtml, downloaded Dec. 24, 2010, Copyright 2006-2009.

* cited by examiner

Primary Examiner — David E Bochna
Assistant Examiner — James Linford
(74) Attorney, Agent, or Firm — Jeffrey L. Ranck

(57) ABSTRACT

A claw clamp has a first half and a second half with a claw formed at one end of each half. Substantially opposite the claw end of the first half a first hole having a larger diameter portion and a smaller diameter portion is formed. Between the first hole and the claw a second hole is formed. A first rod having threads on one end and an enlarged end opposite the threads passes through the first hole and retains a spring inside the first half. A second rod having threads on one end and a knob or hex head opposite the threads passes through the second hole. The threads engage corresponding threads cut into the bottom half. The spring biases the two halves together while the knob or hex head allows the clamp to be tightened.

9 Claims, 4 Drawing Sheets

CLAW CLAMP

BACKGROUND

In vacuum systems several flange standards exist, and the same flange types are called by different names by different manufacturers and standards organizations. Therefore, it is somewhat difficult to identify common terminology to refer to common flange types.

The ISO standard quick release flange is known by the names Quick Flange (QF), Klein Flange (KF) or NW, sometimes also as DN. The KF designation has been adopted by the International Organization for Standardization (ISO), the Deutsches Institut fur Normung (DIN) and Pneurop, a lobbying group for the European compressor and vacuum pump industry. KF flanges are made with a chamfered back surface that attached with a circular clamp and an elastomeric o-ring that is mounted in a metal centering ring.

The ISO large flange standard is known as an LF, LFB, MF or sometimes just an ISO flange. FIG. 1 illustrates a representative ISO flange. The flanges 100 are usually joined by a centering ring 110 and an elastomeric o-ring 120. An extra optional spring-loaded circular clamp or spacer ring 130 is often used around the large diameter o-rings to prevent them from rolling off from the centering ring during mounting.

The ISO large flanges come in at least two varieties. The ISO-K (or ISO LF) flanges shown in FIG. 1 are typically joined with double claw clamps 140 which clamp to a groove 150 on the tubing side of the flange. FIG. 2 illustrates the ISO-F (or ISO LFB) flanges 230 which have holes for attaching the two flanges with bolts. As illustrated in FIG. 2, two tubes with ISO-K and ISO-F flanges can be joined together by clamping the ISO-K side with single claw clamps, such as example single claw clamp 240 (having a single claw 241), which are each bolted to a hole on the ISO-F side.

Returning to FIG. 1, the double claw clamp 140 has first half 160 with first claw 161 and second half 170 with second claw 171 joined by bolt 180. A washer 190 is usually used on the bolt. First half 160 typically has a projection 200 that allows the claws of the clamp to apply pressure to the flanges 100 as bolt 180 is tightened.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples describe a clamp that is able to hold itself on a flange assembly in a properly aligned fashion prior to tightening. This is accomplished by a mechanism that draws or locks the two halves of the clamp together prior to tightening so that the clamp can be positioned on a flange assembly and will hold itself there without intervention until tightening.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions may be accomplished by different examples.

Figure 1:
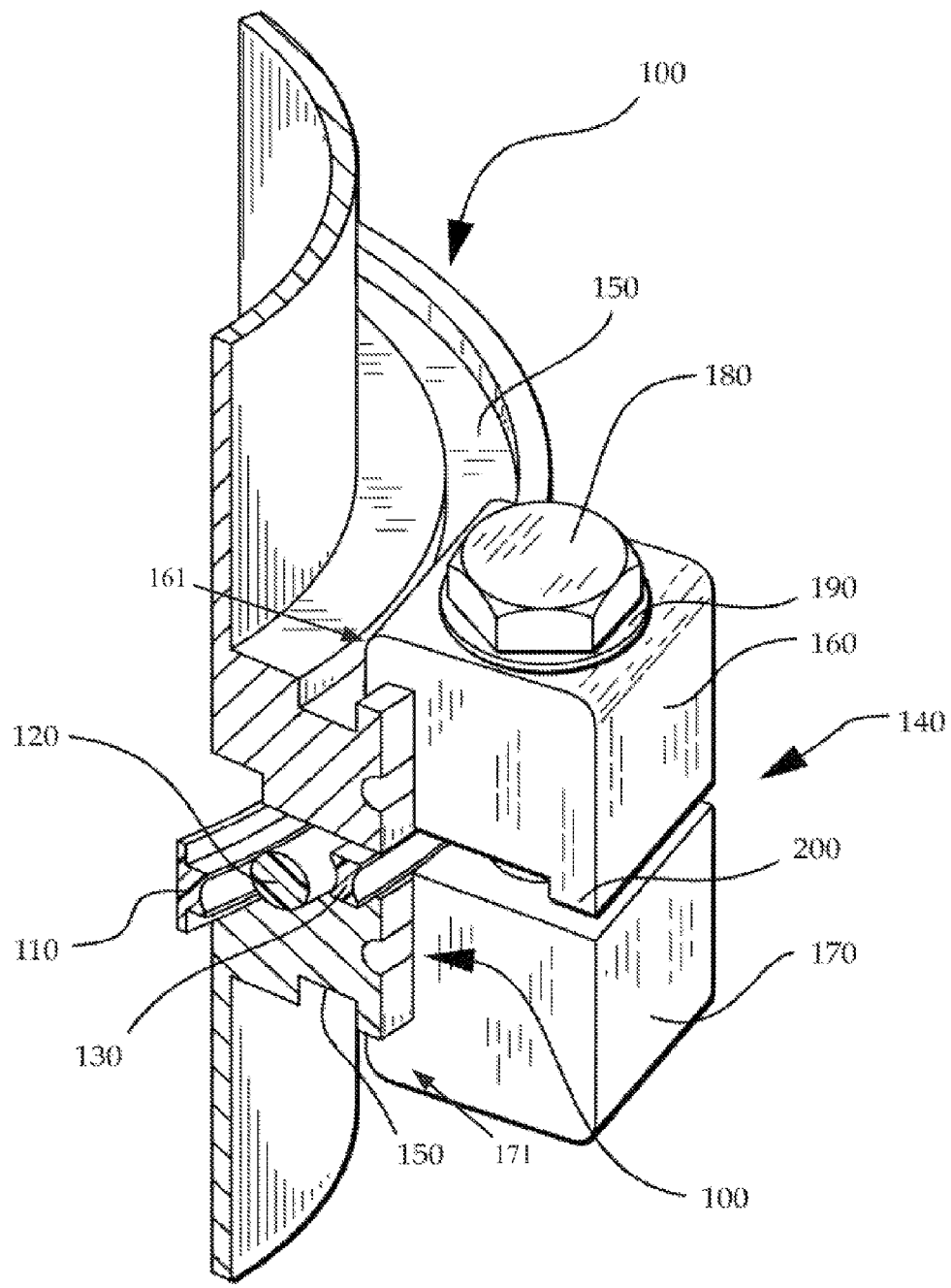
FIG. 1 is a prior art figure showing a double claw clamp and an ISO flange assembly.
Figure 2:
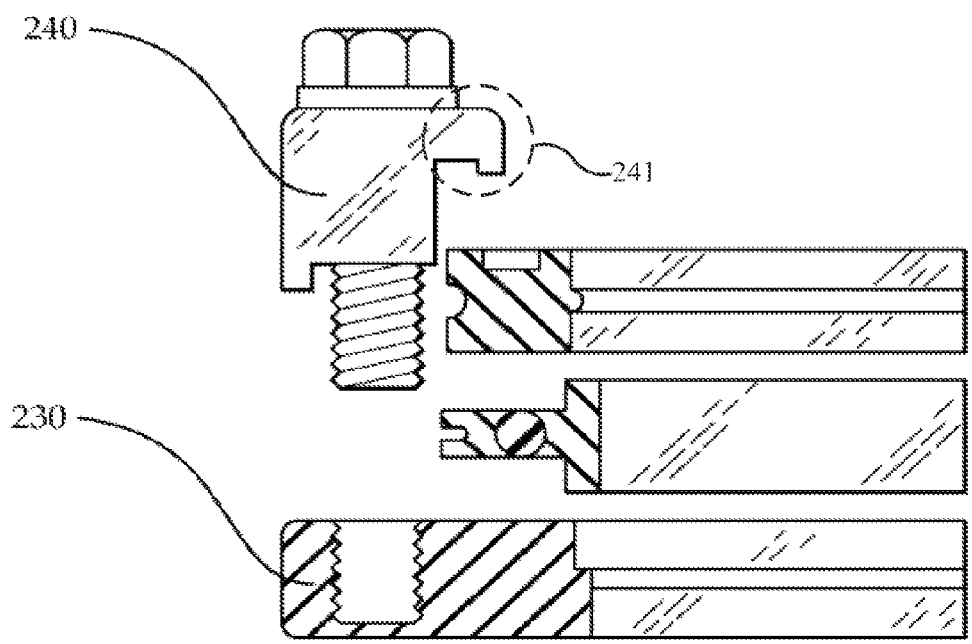
FIG. 2 is a prior art figure showing a single claw clamp.
Figure 3:
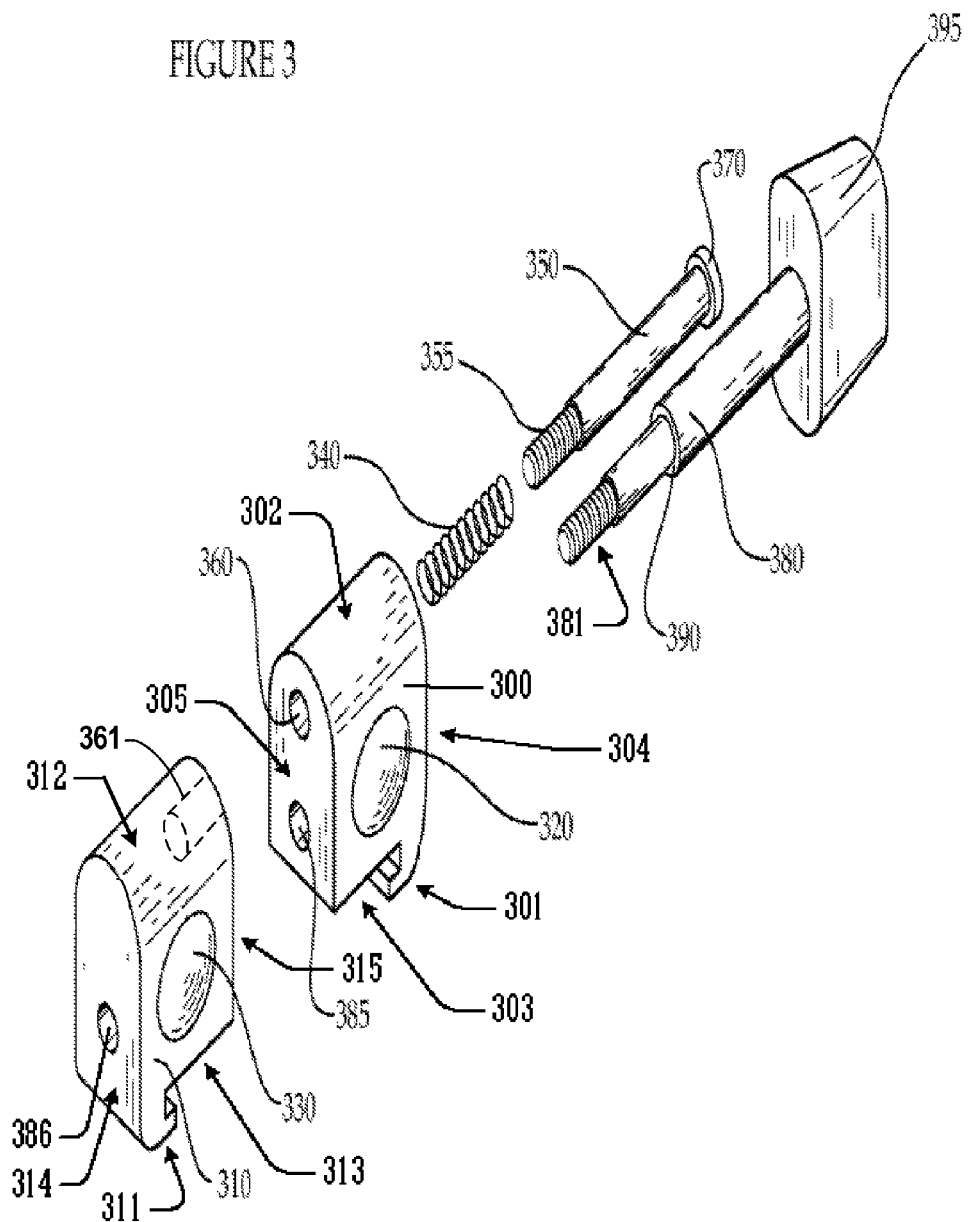
FIG. 3 illustrates a first example.

Turning to FIG. 3 a first example is presented. This example shows a double claw clamp that can be used to clamp an ISO flange assembly. The clamp has a first half 300 with a first claw 301 and second half 310 with a second claw 311. First half 300 includes a top side 304, a bottom side 305 that is substantially opposite top side 304, a first end 303, and a second end 302 that is substantially opposite first end 303. First claw 301 protrudes from first end 303, as illustrated in FIG. 3. Similarly, second half 310 includes a top side 314, a bottom side 315 that is substantially opposite top side 314, a first end 313, and a second end 312 that is substantially opposite first end 313. And second claw 311 protrudes from first end 313, as illustrated in FIG. 3. As illustrated in FIG. 3, first half 300 and second half 310 may be adapted to engage an ISO flange assembly, such as the flange assembly illustrated in FIG. 1. First half 300 and second half 310 may also be adapted to engage other types of flange assemblies if desired. First half 300 and/or second half 310 may also include a step or projection (not shown) such as projection 200 illustrated in FIG. 1. As illustrated in FIG. 3, first half 300 and second half 310 may include areas that are textured and/or hollowed out 320, 330 to afford a better grip when the two halves are grasped to draw them apart.

Examples described herein may include means for drawing the first half 300 and second half 310 together to position the clamp for tightening. In FIG. 3, such means may comprise spring 340. In the example illustrated in FIG. 3, spring 340 is held in place by rod 350, which has threads 355 on one end which will pass through hole 360 of first half 300 and engage corresponding threads 361 cut into second half 310. In the example in FIG. 3, hole 360 is sized such that rod 350 (except for enlarged end 370) will pass through hole 360 while spring 340 will not. One end of spring 340 will engage first half 300 without passing through hole 360, while the other end of spring 340 is held in place by enlarged end 370 of rod 350. Hole 360 may include a larger portion and a smaller portion so that spring 340 is recessed into first half 300, while not completely passing through hole 360.

Although in FIG. 3 the means for pressuring the first half and second half toward each other to hold the clamp in position for tightening is illustrated as comprising a spring, which is held internal to first half 300, other arrangements are also possible. For example, a spring or other such device may be held externally to first half 300 and second half 310 so that as the two halves are drawn apart, a force pressuring the two halves together is generated. As another example, the roles of the first half and second half can be reversed such that a spring, other mechanism, is held internal to second half 310 rather than first half 300. As yet a further example, a magnet or other magnetic device may be used to create a force pressuring the two halves together. Other mechanisms that create either tension or compression between the two halves so as to pressure them together may also be employed. All that is important to the invention is that a force is created that tends to pressure the two halves together at least as the two halves are drawn apart. In one example, the two halves are typically drawn apart by an installer (a person) while installing the clamp on a flange assembly. The pressuring means tends to pressure the two halves back together and hold the clamp on the flange assembly when the clamp is released by the installer.

Examples described herein may also include means for tightening the clamp. In the example illustrated in FIG. 3, such means may comprise rod 380. As illustrated in FIG. 3, rod 380 has threads 381 at one end and a mechanism that allow the rod to be rotated at the other. In FIG. 3, such a mechanism is illustrated by knob 395. However, a hex bolt head or other mechanism can also be used. The threads 381 on rod 380 are designed to pass through hole 385 and engage threads 386 cut into second half 310. Some mechanism, such as a washer (not shown), the enlarged hex head of a bolt (not shown), a knob (like knob 395), and/or shoulder 390 is designed to engage first half 300 so that as rod 380 is rotated, the clamp is tightened sufficiently for the flange assembly.

Examples described herein may also include means to prevent pivoting of the first half relative to the second half. In the example illustrated in FIG. 3, no further structure is required for such means. Rod 350 and rod 380 both pass through first half 300 and engage second half 310. Thus, these rods will prevent first half 300 from pivoting relative to second half 310. In other embodiments, such as those illustrated in FIG. 5 or FIG. 6, other structure may perform this function.

Figure 4:
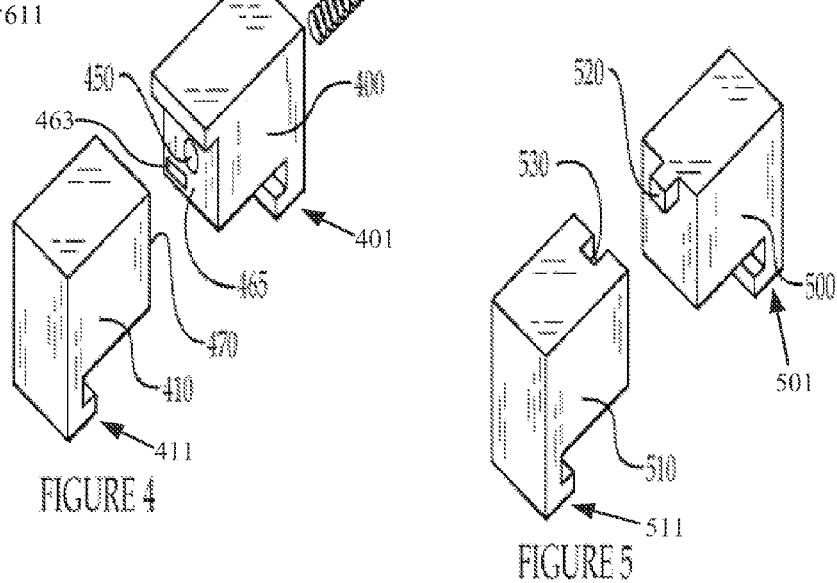
FIG. 4 illustrates a second example.

Turning now to FIG. 4, another example is illustrated. The example in FIG. 4 includes first half 400 and second half 410. Although not illustrated, first half 400 and second half 410 may also include textured and/or hollowed out, although such is not required.

As previously mentioned, examples described herein may include means for pressuring the first half and second half toward each other to hold the clamp in position for tightening. In FIG. 4, such means may comprise spring 420. In the example illustrated in FIG. 4, spring 420 is held in place by optional washer 430 and rod 440, which has threads 445 on one end which will pass through hole 450 of first half 400 and engage corresponding threads cut into second half 410. In the example in FIG. 4, hole 450 is sized such that rod 440 (except for enlarged end 460) will pass through hole 450 while spring 420 will not. One end of spring 420 will engage first half 400 without passing through hole 450, while the other end of spring 420 is held in place by enlarged end 460 of rod 440. Hole 450 may include a larger portion and a smaller portion so that spring 420 is recessed into first half 400, while not completely passing through hole 450.

Although in FIG. 4 the means for pressuring the first half and second half toward each other to hold the clamp in position for tightening is illustrated as comprising a spring, which is held internal to first half 400, as previously mentioned other arrangements are also possible. For example, a spring or other such device may be held externally to first half 400 (with a first claw 401) and second half 410 (with a second claw 411) so that as the two halves are drawn apart, a force pressuring the two halves together is generated. As another example, the roles of the first half and second half can be reversed such that a spring, or other pressuring means, is held internal to second half 410 rather than first half 400. As yet a further example, a magnet or other magnetic device may be used to create a force that pressures the two halves toward each other as they are drawn apart. An example of such magnet or magnetic forces may be created by embedding a magnet 463 into face 465 of first half 400 and a corresponding magnet or steel plate in corresponding face 470 of second half 410. As the two halves are brought into proximity to each other, a magnetic force will keep the clamp on a flange assembly without intervention until the clamp can be tightened. Other mechanisms that pressure the two halve toward each other as the two halves are drawn apart may also be employed. All that is important to the invention is that a force pressures the two halves toward each other as the two halves are drawn apart.

Examples described herein may also include means for tightening the clamp. In the example illustrated in FIG. 4, such means may comprise rod 440. As illustrated in FIG. 4, and previously described, rod 440 has threads at one end 445 and a mechanism 460 that allow the rod to be rotated at the other. In FIG. 4, such a mechanism is illustrated by a hex bolt although a knob or other mechanism can also be used. As rod 440 is rotated, the clamp is tightened sufficiently for the flange assembly.

As described above, in the example in FIG. 4, the means for pressuring and the means for tightening are combined to use common structures to help reduce the number of parts. However, the tradeoff is that if a means to prevent pivoting of the first half relative to the second half is desired, additional structures are used. In FIG. 4, no such means to prevent pivoting is illustrated.

Figure 6:
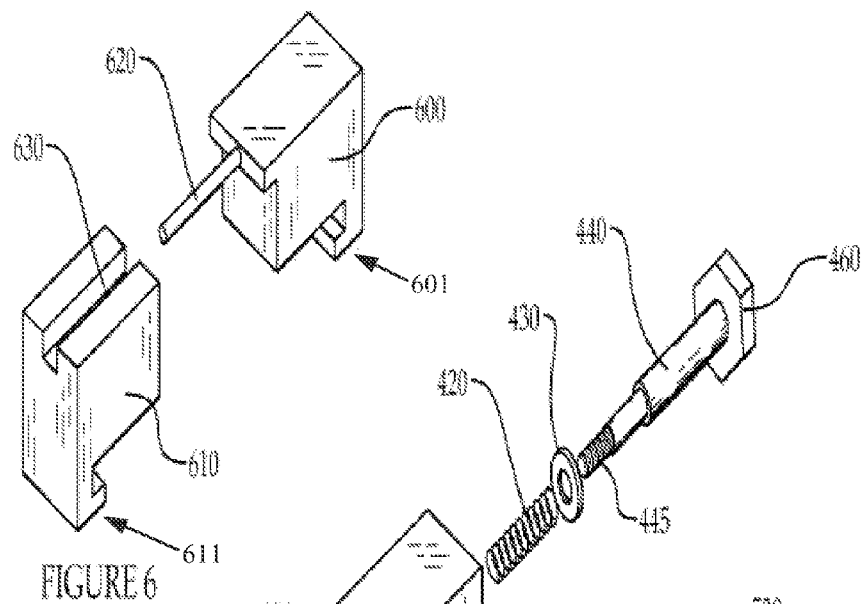
FIG. 6 illustrates a fourth example.
Like reference numerals are used to designate like parts in the accompanying drawings.
Figure 5:
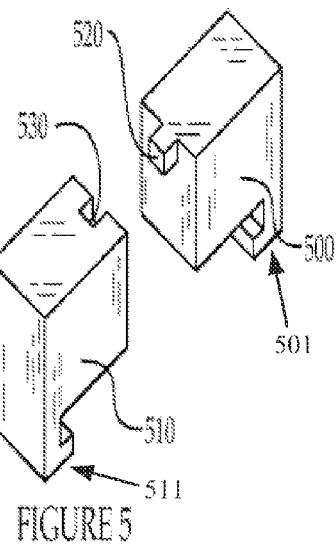
FIG. 5 illustrates a third example.

Turning to the example in FIG. 5 and the example in FIG. 6, means to prevent pivoting of the first half relative to the second half are illustrated that can be used with an appropriate example. In FIG. 5 and FIG. 6, only the means to prevent pivoting of the first half relative to the second half is discussed. However, such an example may include other structures and/or means such as those previously described in conjunction with FIG. 3 and/or FIG. 4, or others.

In FIG. 5, means to prevent pivoting of the first half relative to the second half comprises projection 520 of first half 500 (with a first claw 501) which engages slot 530 of second half 510 (with a second claw 511).

In FIG. 6, means to prevent pivoting of the first half relative to the second half comprises structure 620 of first half 600 (with a first claw 601) which engages slot 630 of second half 610 (with a second claw 611).

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A clamp comprising:
    a first half comprising a first claw that protrudes from a first end of the first half, a first hole located proximal a second end of the first half, the first hole located substantially opposite the first end of the first half, and a second hole located between the first hole and the first claw, each of the first hole and the second hole having a larger diameter portion and a smaller diameter portion and a transition formed there between;
    a second half comprising a second claw that protrudes from a first end of the second half, a third hole located proximal a second end of the second half, the third hole located substantially opposite the first end of the second half, and a fourth hole located between the third hole and the second claw, the third hole in substantial alignment with the first hole and the fourth hole in substantial alignment with the second hole when the first half is aligned with the second half, the third hole and fourth hole comprising internal threads;

a first threaded rod comprising threads on one end and a hex head or knob on the opposite end and a non-threaded portion there between, a shoulder formed in the non-threaded portion, the first threaded rod passing through the second hole and engaging the internal threads of fourth hole, the shoulder engaging the transition between the smaller diameter portion and the larger diameter portion of the second hole;

a second threaded rod comprising a threaded portion, an enlarged end and an non-threaded portion there between, the second threaded rod passing through the first hole and engaging the internal threads of the third hole; and a spring retained by the second threaded rod internal to the first half in the larger diameter portion of the first hole between the enlarged end of the second threaded rod and the transition formed between the smaller diameter portion and the larger diameter portion of the first hole.

2. A clamp as in claim 1, where the first threaded rod comprises the hex head.

3. A clamp as in claim 1, where the first threaded rod comprises the knob.

4. A clamp as in claim 1, where the first half further comprises a grip area recessed into a side of the first half.

5. A clamp as in claim 4 where the second half further comprises a grip area recessed into a side of the second half.

6. A clamp as in claim 1 where the first claw is shaped to engage a first substantially circular flange.

7. A clamp as in claim 6, where the second claw is shaped to engage a second substantially circular flange, where the first substantially circular flange is concentric with the second substantially circular flange.

8. The clamp of claim 1 where the first threaded rod and the second threaded rod prevent pivoting of the first half relative to the second half.

9. A clamp as in claim 1 wherein:

the retained spring forces the first half toward the second half with sufficient force that when the clamp is placed on a flange assembly, with the first claw and second claw each engaged in a groove of the flange assembly, the clamp remains in place without intervention prior to tightening.

* * * * *